(12) United States Patent
Takenaka et al.

(10) Patent No.: US 6,528,028 B2
(45) Date of Patent: Mar. 4, 2003

(54) PROCESS FOR TREATING BAUXITE IN WHICH A DESILICATION PRODUCT AND AN INSOLUBLE RESIDURE ARE SEPARATELY PRECIPITATED (75) Inventors: Yoshiyuki Takenaka, Yokohama (JP); Yasuo Kawai, Yokohama (JP); Isao Ishikawa, Yokohama (JP)

(73) Assignee: Showa Denko K.K., Tokyo (JP)

( * ) Notice: Subject to any disclaimer, the term of this patent is extended or adjusted under 35 U.S.C. 154(b) by 24 days.

(21) Appl. No.: 09/749,632

(22) Filed: Dec. 28, 2000

(65) Prior Publication Data

US 2001/0028870 A1 Oct. 11, 2001

Related U.S. Application Data (60) Provisional application No. 60/189,492, filed on Mar. 15, 2000.

(30) Foreign Application Priority Data

Dec. 28, 1999 (JP) .............................. 11-374946

(51) Int. Cl.[7] .................................................. C01F 7/00
(52) U.S. Cl. ...................... 423/118.1; 423/121; 423/130
(58) Field of Search .............................. 423/118.1, 119, 423/121, 127, 625, 130

(56) References Cited

U.S. PATENT DOCUMENTS

| 3,876,749 | A | | 4/1975 | Horvath et al. |
| 3,989,513 | A | | 11/1976 | Dobos et al. |
| 4,045,537 | A | | 8/1977 | Hrishikesan ................. 423/119 |
| 4,256,709 | A | | 3/1981 | Sizyakov et al. |
| 4,483,830 | A | | 11/1984 | Cresswell et al. |
| 4,512,809 | A | | 4/1985 | Nielsen et al. |
| 4,661,328 | A | * | 4/1987 | Grubbs ........................ 423/121 |
| 5,118,484 | A | * | 6/1992 | The et al. .................... 423/121 |
| 6,168,767 | B1 | | 1/2001 | Welton et al. |
| 6,309,615 | B1 | * | 10/2001 | Hollitt et al. ................ 423/121 |
| 2001/0005497 | A1 | | 6/2001 | Kawai et al. |

FOREIGN PATENT DOCUMENTS

| JP | 37-8257 | | 7/1962 |
| JP | 5-170434 | | 7/1993 |
| JP | 6-172876 | | 6/1994 |
| JP | 7-166252 | | 6/1995 |
| WO | 94/02416 | * | 2/1994 |
| WO | 96/06043 | * | 2/1996 |

OTHER PUBLICATIONS

Kazuo Akashi et al, "Recent Tendency of Researches on Utilization of Red Mud", *Keikinzoku* (*Light Metals*), 1976, vol. 26, No. 3, pp. 150–163, No month.

* cited by examiner

*Primary Examiner*—Steven Bos
(74) *Attorney, Agent, or Firm*—Sughrue Mion, PLLC (57) ABSTRACT A process in which alumina is extracted from bauxite with an aqueous alkali solution, and a desilication product is precipitated such that the product is not contained in a bauxite residue and does not form a complex. The desilication product is mixed with a calcium compound, and the mixture is calcined, to thereby solubilize and recover an alkali component of the product. In addition, an alkali component is removed from a residue (a solid product), and the residue is effectively used as a resource.

19 Claims, 6 Drawing Sheets

PROCESS FOR TREATING BAUXITE IN WHICH A DESILICATION PRODUCT AND AN INSOLUBLE RESIDURE ARE SEPARATELY PRECIPITATED

This application claims the benefit of Provisional application 60/189,492 filed Mar. 15, 2000.

BACKGROUND OF THE INVENTION

1. Field of the Invention

The present invention relates to a process for treating bauxite, which is widely used as a raw material for producing alumina. More particularly, the present invention relates to a process for treating bauxite in an environmentally friendly manner, which process converts an insoluble residue (called "red mud")—which is produced when bauxite is treated by means of Bayer's process—into a composition which is effectively employed, and enables recycling of an alkali component in Bayer's process, the alkali component being contained in the insoluble residue and inhibiting the effective use of the residue.

2. Description of the Related Art

Conventionally, an insoluble bauxite residue is produced in very large amounts in Bayer's process. In Bayer's process, bauxite is treated with an alkali aluminate solution at high temperature and high pressure, a bauxite residue is separated from the resultant solution and removed, aluminum hydroxide is precipitated in and separated from the aluminate solution containing an alkali component in large amounts, and the aluminum hydroxide is calcined, to thereby produce alumina. The amount of a bauxite residue which is produced in the process varies with the quality and the treatment process of bauxite. About 600 kg to 1,000 kg of a bauxite residue is produced for every 1 ton of alumina. A bauxite residue contains large amounts of iron oxide, silicon oxide, and aluminum oxide, and thus extensive studies have been performed in an attempt to use the residue as a material such as a raw material for producing iron or a material for construction, and to enable effective use of these components after extraction and separation.

For example, there have been proposed a process for using such a bauxite residue as aggregate and a process for using the residue as a raw material for producing cement. However, alkali contained in a bauxite residue reacts with cement and the cement may become brittle. Therefore, the amount of the residue which is used for cement is limited, and the residue has never been actually used. Incidentally, there has been proposed a process for converting a silicate compound contained in a bauxite residue into a zeolite, and using the zeolite as an adsorbent. However, such a silicate compound contains alkali, and thus after the zeolite which is produced from the compound is used, the thus-used zeolite must be disposed of. Meanwhile, additional waste which must be treated is produced during the conversion of the compound into the zeolite.

In addition to the aforementioned processes, in an attempt to enable effective use of a bauxite residue, extensive, long-term studies have been carried out. However, in many cases, a large amount of a residue after the treatment of bauxite is not effectively used and is disposed of, for the reasons described below. The size of particles of the residue is as small as 4 microns, and thus carrying out dehydration treatment and handling the particles are very difficult. In addition, the bauxite residue contains an alkali component in large amounts.

U.S. Pat. No. 4,045,537 discloses a process for removing alkali contained in a bauxite residue, which is the so-called "soda lime process." In the process, a bauxite residue is mixed with a calcium compound, the mixture is sintered in a reducing atmosphere, and the sintered product is washed and alkali is recovered, to thereby use the product as a raw material for producing iron. However, the treated product contains $Na_2O$ in an amount of more than 1 wt % and the product is unsatisfactory as a raw material for producing iron, although large-scale equipment is necessary in the process since all of an insoluble residue is treated. Meanwhile, Japanese Patent Application Laid-Open (kokai) Nos. 6-172876 and 7-166252 disclose a process for subjecting a bauxite residue to mineral dressing or chemical treatment by use of an acid, to thereby produce a raw material composition for iron production. In the process, the amount of alkali contained in the residue is reduced, and the residue can be used as a raw material for iron production. However, the process is unsatisfactory in consideration that a solution after acid treatment and a desilication product containing alkali must be treated.

Substantially, bauxite does not contain $Na_2O$, but red mud usually contains $Na_2O$ in an amount of 5 wt % or more, which amount varies with the form and the treatment process of bauxite. Such an alkali component is incorporated into red mud, for the reasons described below. An $SiO_2$ component (which is called reactive silica) of clay predominantly comprising kaolinite, which is contained in bauxite, reacts with alkali in a solution, producing an insoluble desilication product (sodium aluminosilicate) predominantly comprising sodalite. Therefore, a bauxite residue is an insoluble residue which predominantly comprises iron oxide and a desilication product containing an alkali component.

A bauxite residue is produced in large amounts, and thus the residue is used as a material for construction which is consumed in large amounts, such as a raw material of cement, aggregate, or subgrade, or a raw material for iron production. When the residue is used as a raw material of cement, iron oxide, silicon oxide, and aluminum oxide are added to a calcareous raw material, to thereby produce portland cement. In this case, the residue is standardized to contain $Na_2O$ in an amount of 1 wt % or less. When the residue is used as a raw material for iron production, the amount of $Na_2O$ in the residue must be 1 wt % or less, since problems in operation, such as deterioration of a refractory substance in a shaft furnace, may occur.

However, there has not yet been considered a process for producing a bauxite residue containing as little alkali as possible, and treating bauxite with an alkali aluminate solution without production of additional waste during the production of the residue.

In view that it will not always be possible to dispose of a residue which is produced after the treatment of bauxite, and that disposal of an insoluble residue containing an alkali component may become an environmental issue in the future, an object of the present invention is to develop a new process for treating bauxite, which process comprises removing an alkali component from a bauxite residue without production of additional waste, recovering the alkali component and recycling the same in Bayer's process, and effectively using the bauxite residue as material, which process is environmentally friendly and industrially effective. The present invention has been accomplished on the basis of the object.

SUMMARY OF THE INVENTION

In order to attain the above-described object, the present inventors have performed extensive studies, and have found that, in Bayer's process in which bauxite is treated with an alkali aluminate solution to thereby produce alumina, when a desilication product and an insoluble residue are separately precipitated without incorporation of the desilication product into a bauxite residue or production of a complex of the desilication product, the insoluble residue other than the desilication product becomes a bauxite residue containing no alkali component, and when the desilication product is treated with a calcium compound and an alkali component is solubilized to thereby separate the alkali component from the desilication product and recover the component, the alkali component can be recycled in Bayer's process almost completely. The present inventors have also found that the bauxite residue contains an alkali component in very small amounts, and thus the residue can be effectively used as a resource. The present invention has been accomplished on the basis of these findings.

Accordingly, the present invention provides the following process.

(1) A process for treating bauxite characterized by comprising:
a) a step for extracting an alumina component from bauxite with an alkali aqueous solution under conditions for suppressing the production of a desilication product to the utmost, and separating the resultant solution into a first insoluble residue containing alkali in small amounts and an aqueous solution containing alumina and silica components;
b) a step for adding seeds to the thus-separated aqueous solution to thereby precipitate a desilication product, and separating the solution into the solid desilication product and an aqueous solution containing an alumina component; and
c) a step for mixing the thus-separated desilication product and a calcium compound, calcining the mixture, and washing the calcined product with water and filtering the resultant aqueous solution, to thereby separate the solution into a second insoluble residue containing an alkali in reduced amounts and an aqueous solution containing an alkali component.

(2) A process for treating bauxite according to (1), wherein the aqueous solution in step c) contains an alkali component together with an alumina component.

(3) A process for treating bauxite according to (1) or (2), wherein the step for extracting the alumina component from bauxite is carried out under conditions in which the alumina component is dissolved as much as possible and the dissolution of a silica component is suppressed as much as possible.

(4) A process for treating bauxite according to (1) or (2), wherein the step for extracting the alumina component from bauxite is carried out under conditions in which the dissolution of the alumina component is suppressed as much as possible and a silica component is preferentially eluted.

(5) A process for treating bauxite according to (4), which further comprises a step for treating the first insoluble residue with an alkali aqueous solution again, for extraction of an alumina component.

(6) A process for treating bauxite according to any of (1) through (5), wherein precipitation of a desilication product in the first insoluble residue is prevented by carrying out solid-liquid separation immediately after the alumina component is extracted from bauxite with the alkali aqueous solution under conditions for suppressing the production of a desilication product to the utmost.

(7) A process for treating bauxite according to any of (1) through (6), wherein the alkali is sodium hydroxide.

(8) A process for treating bauxite according to any of (1) through (7), wherein the first insoluble residue contains alkali in an amount of about 1 wt % or less.

(9) A process for treating bauxite according to any one of (1) through (8), wherein the first insoluble residue is used as a raw material for iron production.

(10) A process for treating bauxite according to any one of (1) through (9), wherein the calcium compound includes at least one species selected from among limestone, quicklime, slaked lime, and calcium carbonate.

(11) A process for treating bauxite according to any one of (1) through (10), wherein, when the calcium compound which is added to a desilication product containing a silica component is reduced to CaO, the mol ratio of CaO to $SiO_2$ ($CaO/SiO_2$) is about 2–5, and the calcining is carried out at about 1,150–1,350° C.

(12) A process for treating bauxite according to any one of (1) through (11), wherein the desilication product and the calcium compound which are calcined have a particle size of about 60 $\mu$m or less.

(13) A process for treating bauxite according to any one of (1) through (12), wherein the desilication product and the calcium compound are granulized in advance, for suppressing dust generation during said calcination.

(14) a process for treating bauxite according to any one of (1) through (13), wherein heat generated during said calcination is used in a process for producing aluminum hydroxide or alumina from bauxite.

(15) A process for treating bauxite according to any one of (1) through (14), wherein an organic impurity which is generated and accumulated in a process for producing aluminum hydroxide or alumina from bauxite is incinerated during said calcination.

(16) A process for treating bauxite according to any one of (1) through (15), wherein the second insoluble residue contains alkali in an amount of about 1 wt % or less.

(17) A process for treating bauxite according to any one of (1) through (16), wherein the second insoluble residue is used as a raw material of cement.

(18) A process for treating bauxite according to any one of (1) through (17), wherein the desilication product is sodalite or a substance predominantly containing sodalite.

(19) A process for treating bauxite according to any one of (1) through (18), wherein the alkali component which is recovered in step c) is recycled in the process for treating bauxite.

DETAILED DESCRIPTION OF THE INVENTION

"Bauxite," which is used in the present invention as a raw material, is a general term for alumina-containing ore in which a primary crystal form of an alumina component is gibbsite ($Al(OH)_3$), and bauxite contains $Al_2O_3$ in an amount of about 30 wt % or more. Usually, gibbsite accounts for about 70% or more in an alumina component, and bauxite contains $Fe_2O_3$ in an amount of about 10 wt % or more and $SiO_2$ in an amount of about 20 wt % or less in addition to an alumina component. A sodium hydroxide solution containing alumina is preferably used as an alkali solution for treating bauxite, and an alkali solution which is usually used contains alkali in amount of about 100–300 g/l as reduced to $Na_2O$. In the present invention, after bauxite is treated with the aforementioned alkali solution and an alumina component is extracted from the bauxite, the amount of $Na_2O$ contained in a bauxite residue that is effectively used as a material can be reduced to about 1% or less.

Figure 1A:
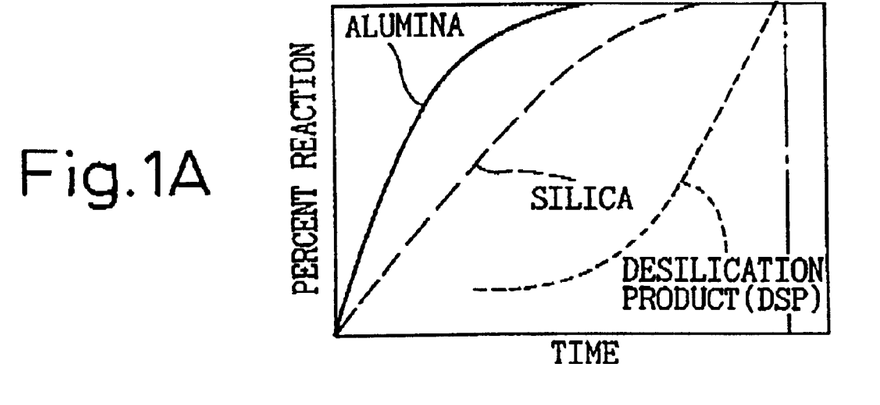
FIGS. 1A to 1C show the reaction percentages of alumina, silica, and a desilication product as a function of time in different processes for treating bauxite.

Usually, bauxite is mixed with an alkali aluminate solution and the bauxite is wet-ground, and then the bauxite is dissolved in the solution at about 100–160° C. for extraction of an alumina component. Since clay (which predominantly contains kaolinite) is contained in bauxite in small amounts, a silica component (which is also called "reactive silica") in the clay is eluted in the solution. The concentration of silica in the solution varies with the amount of reactive silica in bauxite, the temperature of the solution, the amount of alkali or alumina in the solution, and so on. Usually, the solution contains silica in an amount of about 1 g/l or more after elution of reactive silica. When the amount of the silica component which is eluted in the solution is not reduced, the silica component is accumulated as scale in a heat exchanger in Bayer's process, or accumulated as an impurity in aluminum hydroxide which is a final product, inducing serious problems in operation. Therefore, in order to reduce the amount of the silica component of the solution to the extent that no problems arise in operation, some processes for precipitating the silica component of the solution are proposed. For example, the following process is proposed: bauxite is mixed with an alkali aluminate solution and ground; the resultant slurry is maintained at about 80° C. or higher with stirring for about one hour or longer, to thereby produce a nucleus which promotes a desilication reaction or a desilication product in advance; and the slurry is further heated in a dissolution-reaction vessel, to thereby simultaneously carry out extraction of alumina and further elution of reactive silica, to precipitate silica in the solution, by which extraction of alumina and elution and precipitation of silica are simultaneously carried out. However, in the process, there is obtained a bauxite residue which comprises a precipitate; i.e., a desilication product containing alkali predominantly containing sodalite, and an insoluble residue which predominantly contains iron oxide. In the bauxite residue, separating the desilication product and the insoluble residue from each other is difficult. In FIG. 1A, the reaction percentages of alumina, silica, and a desilication product (DSP) are shown as a function of time. As is apparent from FIG. 1A, extraction of alumina and precipitation of a desilication product proceed simultaneously.

As used herein, the term "desilication product" refers to an insoluble silicon-containing compound which is produced as follows: a soluble silica component contained in bauxite is eluted in an alkali aqueous solution, and the silica component is reacted with alkali and alumina components. Examples of such desilication products include an alkali aluminate compound, specifically sodalite.

In the present invention, there is employed or applied a dissolution process and dissolution conditions such that an insoluble residue such as iron oxide and a desilication product containing alkali are separately recovered when alumina is extracted from bauxite with an alkali aluminate solution.

Examples of such a dissolution process are as follows. 1) Japanese Patent Application Laid-Open (kokai) No. 37-8257 discloses a process making use of a difference in reaction rate between alumina and silica, in which an alumina component is dissolved as much as possible, whereas dissolution of a silica component is suppressed as much as possible (hereinafter, for the sake of explanation, the process will be referred to as a "silica elution suppressing process"). 2) Japanese Patent Application Laid-Open (kokai) No. 5-170434 discloses a process in which dissolution of an alumina component is suppressed as much as possible and a silica component is preferentially eluted, by use of a solution of high alkali concentration (hereinafter, for the sake of explanation, the process will be referred to as a "silica elution promoting process"). In the present invention, either of these processes may be employed, and in practice, only one of the processes is employed, in consideration of the quality of bauxite and the costs of equipment and energy.

According to the "silica elution promoting process," in order to enhance the ability of a solution to dissolve silica (i.e., the ability of the solution to maintain the dissolved state of silica therein stably while suppressing precipitation of the silica to the utmost), the concentration of $Na_2O$ in the solution is determined to be higher and the dissolution temperature is determined to be lower, as compared with the case of the "silica elution suppressing process," when the same bauxite is employed in these two processes. It is important that bauxite be treated with an alkali aluminate solution under conditions such that precipitation of an insoluble desilication product predominantly containing sodalite is suppressed. These two dissolution processes will next be described in detail.

In the "silica elution suppressing process," dissolution conditions vary with the quality of bauxite and the type of dissolution apparatus. Usually, when the concentration of $Na_2O$ in an alkali aluminate solution which is mixed with bauxite is about 100–150 g/l, the dissolution temperature is about 105–140° C., and the dissolution time is about 1–40 minutes, reaction proceeds such that the dissolution percentage of an alumina component is about 80 wt % or more and the elution percentage of reactive silica is about 50 wt % or less. The dissolution conditions may be determined in consideration of the quality of bauxite, the type of dissolution apparatus, and the extraction percentage of alumina such that extraction is carried out at low cost. Basically, when the dissolution temperature is low, the dissolution time is long, whereas when the dissolution temperature is high, the dissolution time is short. In the process, a residue which is produced after dissolution contains a predominant proportion of kaolinite and an insoluble residue such as iron oxide. The residue contains kaolinite, which may be converted into a desilication product, and thus the solution containing the residue must be separated into solid and liquid as quick as possible after dissolution. After completion of solid-liquid separation, the solution usually contains reactive silica in an amount of about 2–4 g/l as reduced to $SiO_2$, since a reactive silica component of a portion of kaolinite is eluted in an alkali aluminate solution. Therefore, the amount of reactive silica must be reduced to the extent that no problem arises in operation. In order to reduce the amount, a desilication step is provided in the process, and seeds are added to the solution, precipitating a desilication product. Preferably precipitation is carried out at a solution temperature of about 90–130° C., and the precipitation time is about 20 minutes to about five hours. Seeds which are added to the solution may be naturally occurring or synthetic sodalite or a zeolite composition. The mean particle size of the seeds is preferably about 1–25 μm. The amount of seeds which are added is about 20–200 g/l. When precipitation is carried out under these conditions, after completion of precipitation, the concentration of $SiO_2$ in the solution is maintained at about 0.4–0.6 g/l. When the concentration falls within the specified range, no problems arise in operation.

Figure 1B:
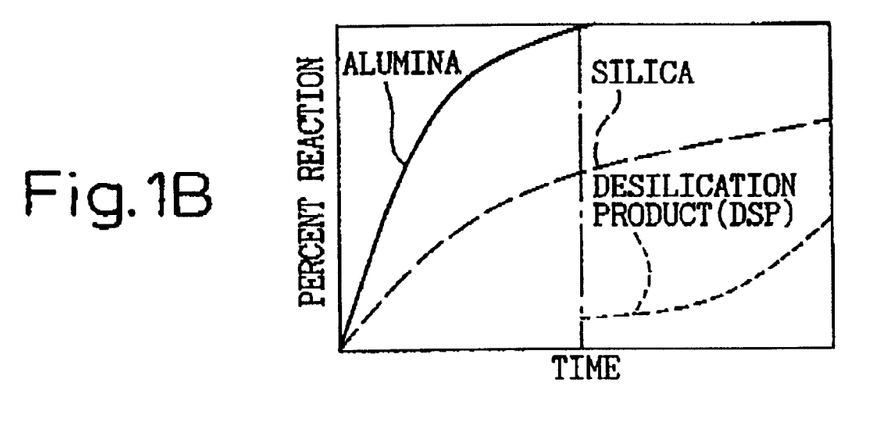

In FIG. 1B, the reaction percentages of silica, alumina, and a desilication product in the "silica elution suppressing process" are shown as a function of time. As is apparent from the figure, the reaction of a desilication product is suppressed during extraction of silica.

In the "silica elution promoting process," the concentration of $Na_2O$ in an alkali aluminate solution which is used in silica elution reaction is higher as compared with the case of the "silica elution suppressing process." usually, when the concentration of $Na_2O$ is about 155–240 g/l, the dissolution temperature is about 100–120° C., the dissolution time is about 40 minutes to about seven hours, the dissolution percentages of an alumina component and a silica component are about 30 wt % or less and about 70 wt % or more, respectively, and production of a desilication product is suppressed. Namely, in the process, an alumina component of bauxite is rarely dissolved, but most of kaolinite is eluted in an alkali aluminate solution. Immediately after completion of reaction, solid-liquid separation is carried out in order to prevent precipitation of eluted silica component. After solid-liquid separation, the resultant solid product is bauxite containing kaolinite in substantially very small amounts. Alumina is extracted from the solid product by use of an alkali aluminate solution through customarily-employed Bayer's process, and the resultant solution is separated into solid and liquid, to thereby yield an insoluble residue. The residue is a composition which predominantly contains iron oxide and rarely contains an alkali component. After completion of solid-liquid separation, the resultant solution contains a silica component in an amount of about 4–12 g/l as reduced to $SiO_2$. Therefore, in order to reduce the amount of the silica component, seeds are added to the solution in the same manner as in the "silica elution suppressing process," precipitating a desilication product. When the precipitation is carried out at about 120–160° C. for about 30 minutes to about four hours, the amount of silica in the solution can be reduced to about 1–2 g/l. In order to further promote the precipitation, hot water may be added to the alkali aluminate solution, to thereby reduce the concentration of $Na_2O$.

Figure 1C:
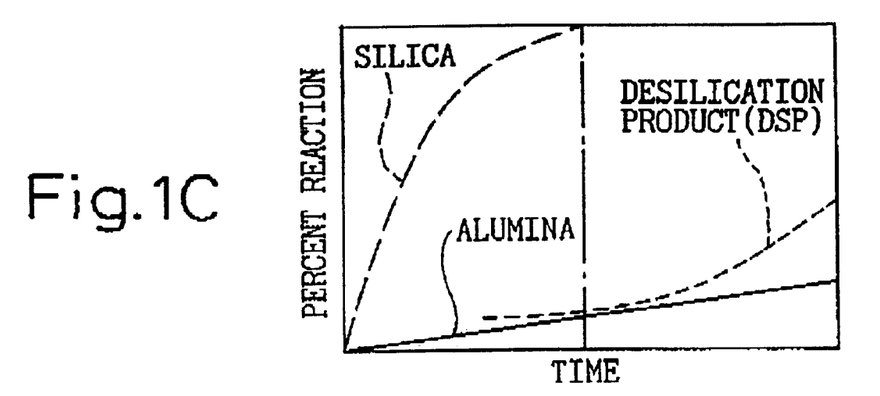

In FIG. 1C, the reaction percentages of silica, alumina, and a desilication product in the "silica elution promoting process" are shown as a function of time. As is apparent from the figure, elution of alumina and production of a desilication product are suppressed during extraction of silica.

After a desilication product is precipitated through the above-described processes, the product is subjected to solid-liquid separation. Examples of apparatuses used for solid-liquid separation include a thickener, a filtering apparatus, and a centrifugal apparatus. These apparatuses may be used singly or in combination. In the solid-liquid separation, the separated solid product may be washed by use of a drain or with hot water which is used in the process, by means of a single cleaning system or a countercurrent multi-step cleaning system, to thereby reduce the amount of alkali contained in the solid product, which is derived from an alkali aluminate solution.

A solid product—which is obtained after bauxite is treated through the above-described processes under conditions such that production of a desilication product is suppressed as much as possible—generally contains $Fe_2O_3$, $Al_2O_3$, $SiO_2$, and $Na_2O$ in amounts of about 45 wt % or more, about 20 wt % or less, about 20 wt % or less, and about 1 wt % or less, respectively. Namely, the solid product is a composition containing an alkali component in very small amounts, in which iron oxide is concentrated. Meanwhile, a desilication product which is separated in a desilication step generally contains $Na_2O$, $Al_2O_3$, $SiO_2$, and iron oxide such as $Fe_2O_3$ in amounts of about 18–25 wt %, about 31–38 wt %, about 28–35 wt %, and about 5 wt % or less(in term of $Fe_2O_3$), respectively, and the product is an insoluble silicate substance such as sodalite. The mean particle size of the desilication product is usually about 1 to about 25 μm.

The thus-obtained desilication product is mixed with a calcium compound, and the mixture is calcined. Examples of calcium compounds which may be employed include limestone, quicklime, slaked lime, and calcium carbonate, which compounds are available in mass amounts at low cost. The particle sizes of the desilication product and the calcium compound are not particularly limited, but they are ground so as to have a particle size of preferably about 1–300 μm, more preferably about 60 μm or less. They may be dry- or wet-mixed, but are preferably wet-mixed. In order to prevent generation of dust, preferably the mixture is calcined after granulation. A kneader or a similar apparatus may be used as a kneading apparatus. A pan-type pelletizer or an extrusion shaping apparatus may be used as a shaping apparatus. The size of a shaped product is preferably about 1–50 mm, in consideration of the type of calcination apparatus, reactivity of the product during calcination, handling of the product when the product is conveyed to a calcination apparatus, and the size of the product such that generation of dust is suppressed as much as possible in a calcination apparatus. However, the size of the shaped product is not particularly limited.

The thus-shaped product is conveyed to a calcination apparatus and calcined therein. The calcination apparatus may be a continuous or batch-type calcination apparatus, but in consideration of cost, a continuous calcination apparatus such as a rotary kiln or a fluidized-bed calcination furnace is preferably used.

The amount of a calcium compound which is added to a desilication product is based on the sodium removal percentage of a desilication step, and is determined in consideration of the size of the shaped product, the calcination conditions such as calcination temperature and calcination time, and the properties of the calcined product. The amount of a calcium compound which is added to a desilication product is regulated by the mol ratio of CaO in the calcium compound to $SiO_2$ in the desilication product. The ratio; i.e., $CaO/SiO_2$, is about 1 or more, preferably about 2–5. The calcination temperature is about 800–1,500° C., preferably about 1,000–1,400° C., more preferably about 1,100–1,350° C. The calcination time is about 5–120 minutes. When calcination is performed under these conditions, the sodium removal percentage of the desilication product contained in the shaped product can be increased to about 90% or more, and further to about 99% or more. In order to increase the sodium removal percentage of the desilication product to about 99% or more, calcination is preferably carried out at about 1,150–1,350° C., and the mol ratio ($CaO/SiO_2$) is preferably regulated to about 2.5–3.5. When the calcination temperature of the shaped product is increased, powder constituting the shaped product is melted and changed in form from powder to solid solution and to glass. When the powder takes the form of solid solution, a portion of the shaped product tends to adhere to the inner wall of a furnace, which causes problems in operation.

The reaction mechanism of sodium removal is complicated and has not yet been elucidated. However, it is assumed that Na and Al components contained in a desilication product are predominantly converted into a soluble sodium aluminate composition, and an Si component reacts with a Ca component, to thereby form an insoluble calcium silicate or calcium aluminosilicate.

During calcination, if an organic substance which is generated and accumulated in the process for producing alumina from bauxite is combusted, the purity of alumina can be increased. In addition, the energy in the calcination step is effectively used, which is preferable. Conventionally, when bauxite is dissolved in alkali, an organic substance (combustible substance by heating) is generated and accumulated. The amount of an organic substance accumulated depends on the type of a raw material and the concentration of alkali, and, for example, a solution of a pre-stage dissolution step contains an organic substance in an amount of about 10–50 g/l. Therefore, such a substance is removed from a solution of dissolution step by means of incineration of the solution or by use of oxalic acid. In the present invention, by feeding a portion of a process solution containing an organic substance into a calcination furnace, the substance can be removed from the solution. In the present invention, since the heat energy in the calcination step is employed, the quality of alumina is enhanced and a conventionally-used incinerating apparatus is not required. Namely, the energy in the calcination step is effectively employed.

In addition, when steam is produced by use of heat which is generated in the calcination step and the steam is used as a heat source for dissolution and extraction of alumina from bauxite, the size of a conventionally-used boiling apparatus can be reduced, and energy efficiency can further be enhanced in the present invention. Conventionally, in Bayer's process, about 1.5–2.0 tons of steam is used per ton of alumina for dissolution of alumina and concentration of a process solution.

As described hereinabove, a calcination step is required in the present invention. However, when the energy generated in the calcination step is effectively used, the amount of energy which is consumed in the present process is almost equivalent to that in a conventional process.

The above-obtained calcined product is cooled by use of a usually-used cooling apparatus, and then conveyed to a grinding step. After being calcined under the above-described conditions, the calcined product becomes relatively soft, and thus the calcined product can be milled by use of a grinding apparatus such as a hammer mill. After milling, water is added to the calcined product, producing a slurry. In the slurry, the amount of water may be about 1–30 times the weight of the calcined product. The higher the temperature of the slurry, the higher the filterability of the slurry. Therefore, the temperature of the slurry is usually about 50° C. or higher, preferably about 70–100° C. The elution time may be about 10–120 minutes. The slurry is filtered by use of a filtering apparatus, and the resultant cake is washed with water for recovery of alkali. A filtering apparatus which is used may be a usually-used vacuum-type or pressure-type filtering apparatus. The thus-obtained cake contains water in an amount of about 30–60 wt %, and the amount of water varies within a certain range in accordance with the performance of a filtering apparatus or the size of the ground particle. After filtration and drying, the resultant product typically comprises $Na_2O$, $Al_2O_3$, $SiO_2$, and $CaO$ in amounts of about 0.5–2%, about 13–18%, about 12–22%, and about 45–55%, respectively.

The resultant filtrate predominantly contains alkali, and contains small amounts of $Al_2O_3$, $SiO_2$, and $CaO$. The filtrate is recycled in the conventional Bayer's process (or may be recycled in a modified Bayer's process). The concentration of alkali in the filtrate is low, and thus the filtrate may be recycled after concentration. When the filtrate is concentrated by use of steam, a boiler is combined with the aforementioned calcination furnace and steam generated in the boiler is used for the concentration, which results in reduction in cost.

Thus, an insoluble residue predominantly comprising iron oxide containing small amounts of alkali, and a calcium silicate compound or calcium aluminosilicate containing small amounts of alkali are obtained. In addition, alkali is recovered, and thus the amount of alkali which is supplemented in Bayer's process can be reduced.

Figure 2:
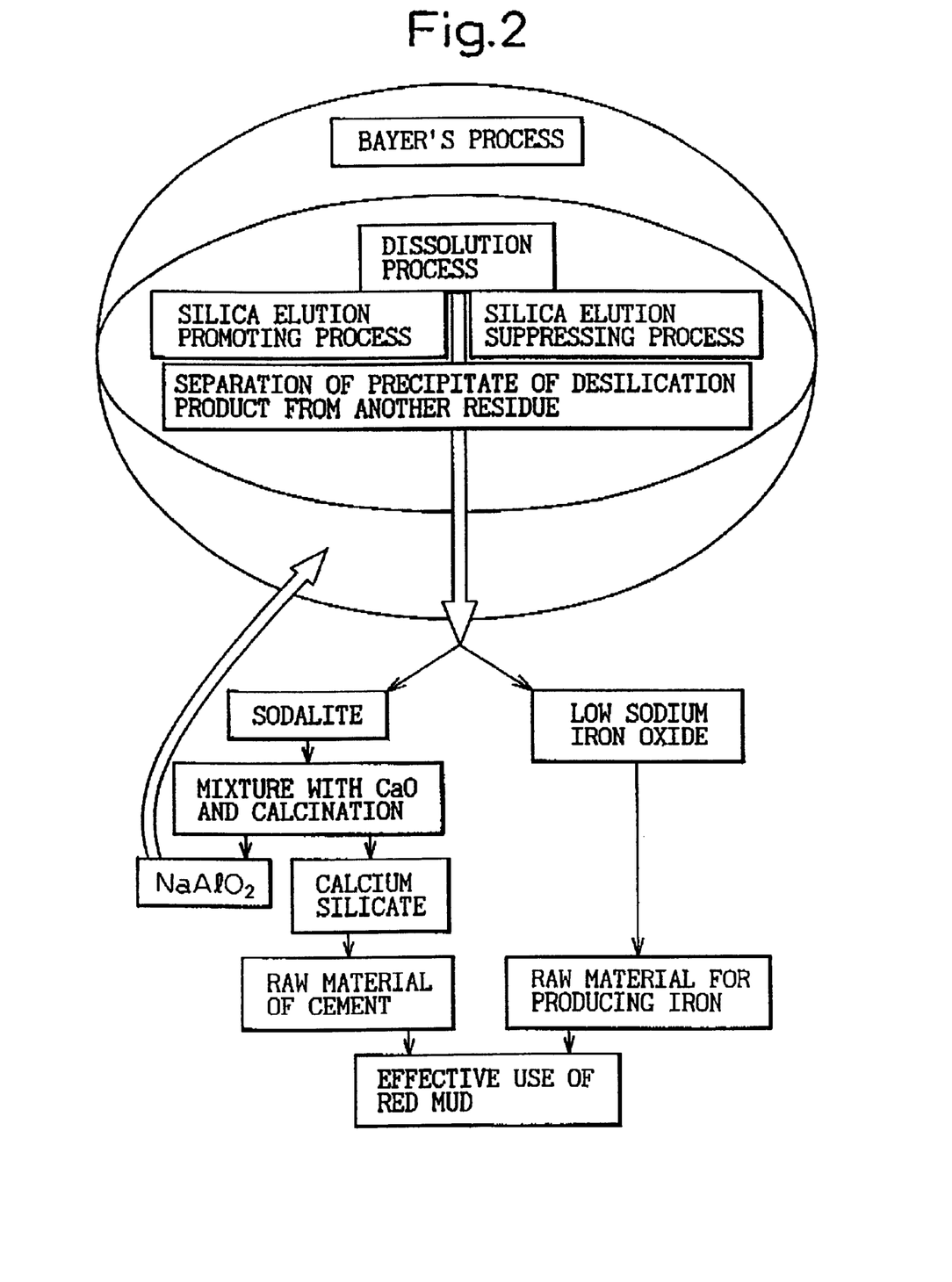
FIG. 2 shows a flowchart of the process for treating bauxite of the present invention.

FIG. 2 shows the summary of the above-described process in the form of a flowchart.

Figure 3A:
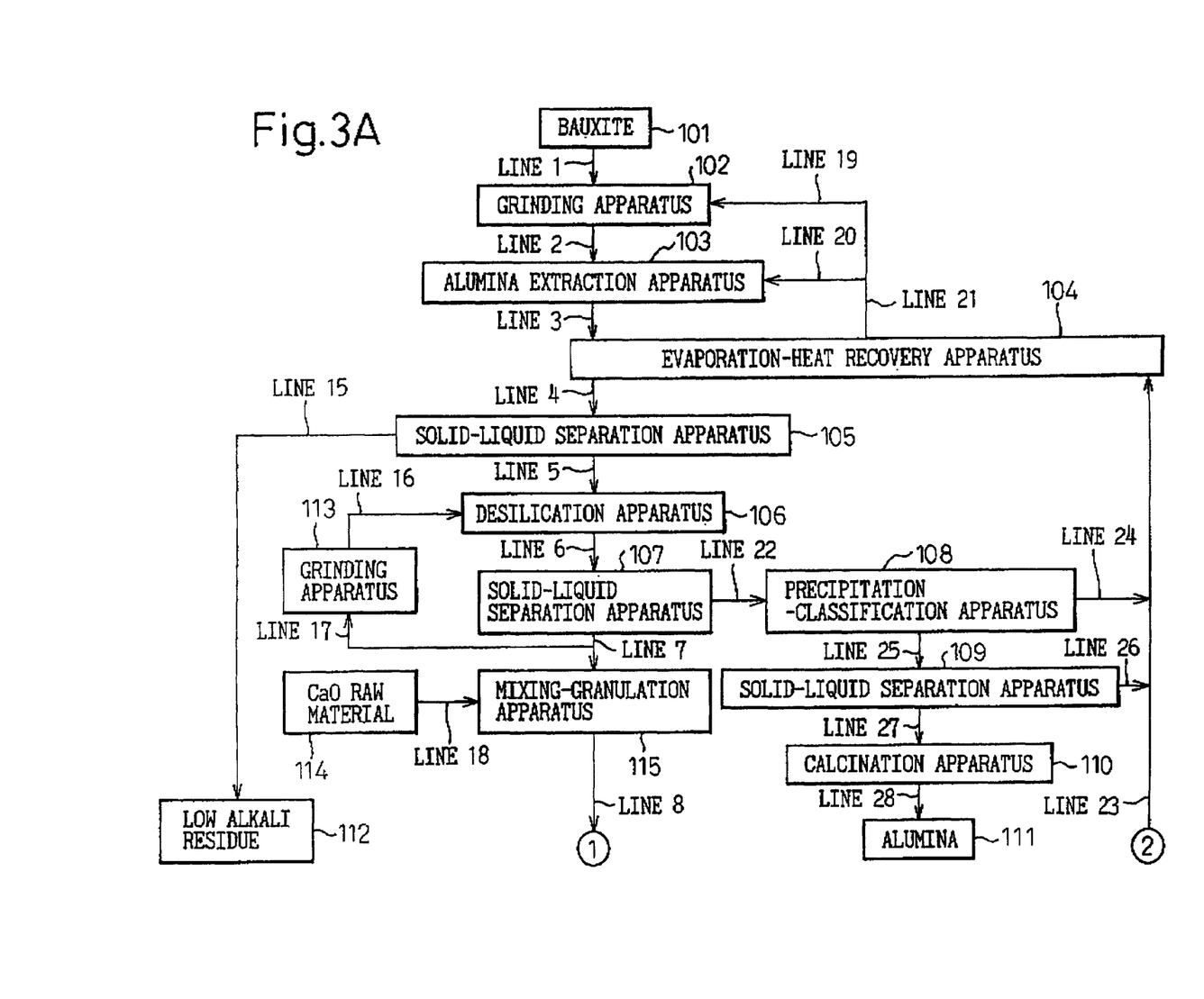
FIGS. 3A and 3B show an embodiment of the present invention making use of the silica elution suppressing process.
Figure 3B:
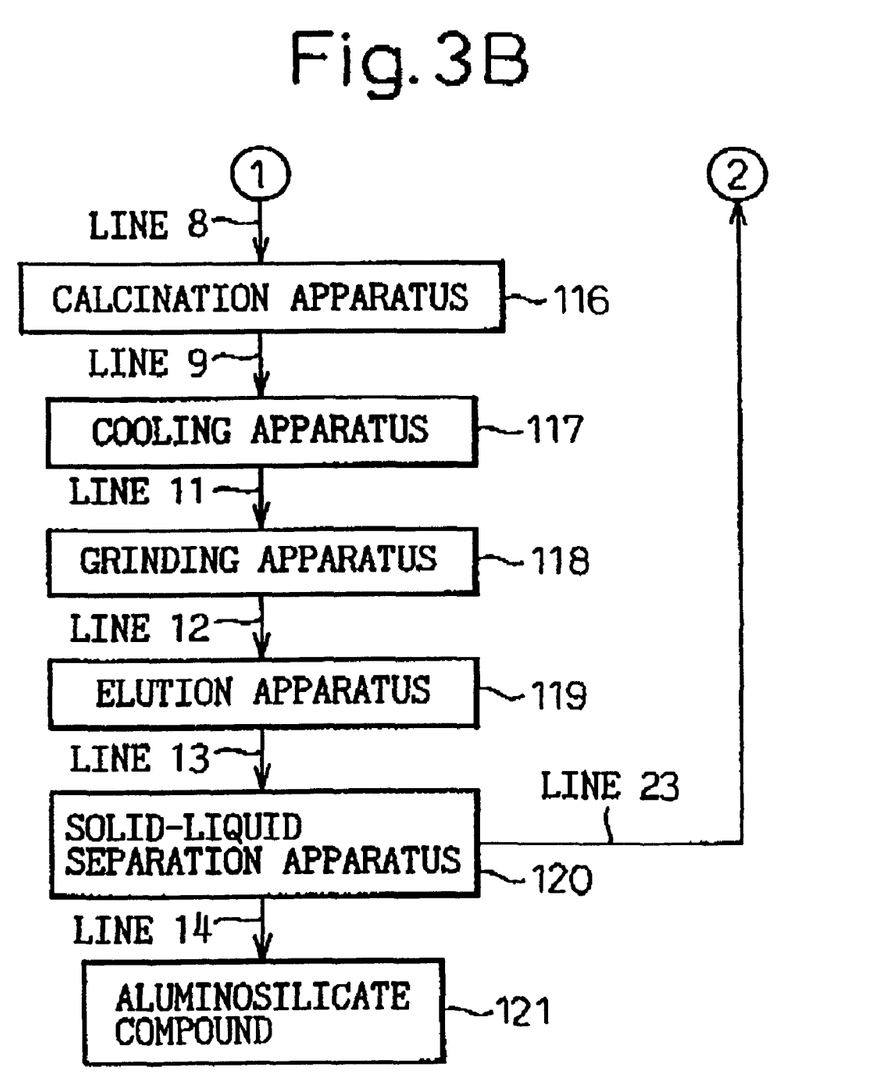
Figure 4A:
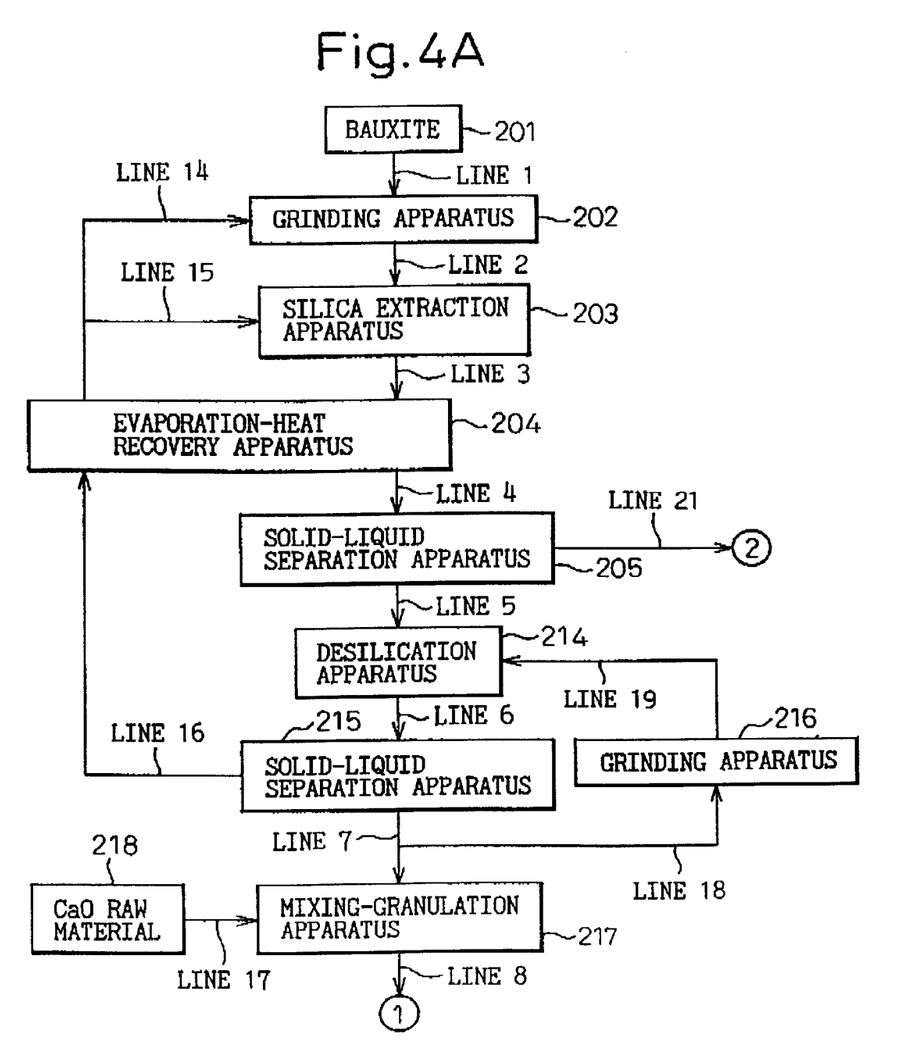
FIGS. 4A and 4B show an embodiment of the present invention making use of the silica elution promoting process.
Figure 4B:
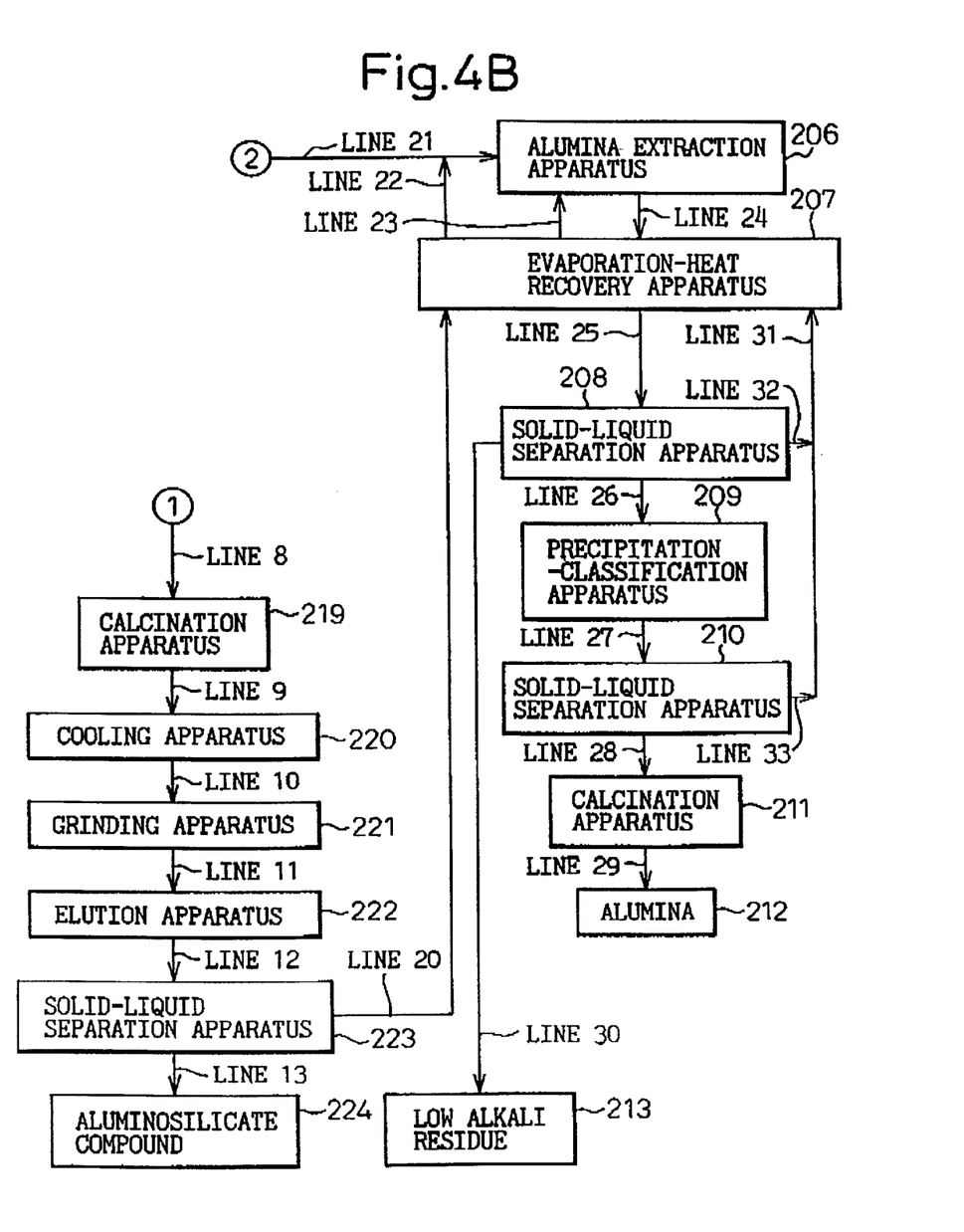

Embodiments of the process for treating bauxite of the present invention will next be described in detail with reference to figures. The present invention is not limited to the embodiment. FIGS. 3A and 3B show an embodiment of the "Silica elution suppressing process," and FIGS. 4A and 4B show an embodiment of the "silica elution promoting process."

As shown in FIGS. 3A and 3B, a recycled alkali aluminate solution supplied through a line 19 is mixed with bauxite 101 supplied through a line 1, and the mixture in the form of a slurry is supplied to a grinding apparatus 102. A ball mill or rod mill is used as the grinding apparatus 102. The bauxite is finely ground and the resultant slurry is supplied to an alumina extraction apparatus 103 through a line 2. Simultaneously, a recycled alkali aluminate solution which is heated is supplied to the alumina extraction apparatus 103 through a line 20 in order to sufficiently elute an alumina component of the bauxite. A tubular or container-type reaction apparatus is used as the alumina extraction apparatus 103. In order to suppress the elution of silica from the bauxite and to extract alumina from the bauxite to the greatest possible extent, in the reaction apparatus, the elution temperature is set to about 105–140° C., and the elution time is set to about 1–40 minutes, which time is relatively short.

In order to prevent production of a desilication product, the slurry of high temperature is immediately supplied from the reaction apparatus (the alumina extraction apparatus 103) to a heat recovery apparatus 104 through a line 3, and the slurry is cooled. The heat recovery apparatus comprises a plurality of flashing cans and a heat exchanger provided at a line 21. The combination of the heat recovery apparatus 104 is optimized in consideration of the cost and the performance of the apparatus and the unit price and unit requirement of steam and sodium hydroxide, and such that the slurry is separated into an insoluble residue and a solution immediately after the slurry is obtained from the reaction apparatus. After being cooled, the slurry is fed to a solid-liquid separation apparatus 105 through a line 4. Examples of the solid-liquid separation apparatus 105 which is used include a centrifugal apparatus, a pressure-resistant filtering apparatus, and a thickener which comprises a feed well and a mud-collecting apparatus and exhausts mud and a solution containing small amounts of a solid component. When the slurry is separated into a filtrate and an insoluble residue in the solid-liquid separation apparatus 105 within about one hour after the slurry is obtained from the reaction apparatus 103, production of a desilication product can be prevented.

The insoluble residue which is separated from the slurry in the solid-liquid separation apparatus 105 is washed with water and dehydrated, and then recovered through a line 15. The thus-treated product predominantly comprises iron oxide containing very small amounts of alkali. The product is shaped in accordance with needs, and can be utilized as an iron souce in variety of uses. The solution separated from the slurry in the solid-liquid separation apparatus 105 contains $SiO_2$ in an amount of about 2–4 g/l, and thus the solution is supplied to a desilication apparatus 106 through a line 5, for precipitation of a desilication product. The desilication apparatus 106 is a reaction vessel provided with a stirring apparatus. In order to promote desilication reaction, a desilication product serving as seeds is added to the apparatus through a line 16. In the desilication reaction vessel, the reaction conditions are as follows. The reaction temperature is about 90–130° C., the reaction time is about 20 minutes to about five hours, the mean particle size of the desilication product serving as seeds is about 1–25 $\mu$m, and the amount of the desilication product which is added is about 20–200 g/l. When desilication is carried out under these conditions, the amount of $SiO_2$ in a solution extracted from the above solution is reduced to about 0.4–0.6 g/l. Therefore, scale is not accumulated in the heat exchanger, and the amount of an impurity in alumina which is a final product is not increased. After completion of desilication, the solution containing a precipitate is fed to a solid-liquid separation apparatus 107 through a line 6, for separation of a desilication product. The separation apparatus 107 may be a centrifugal apparatus, a filtering apparatus, or a thickener.

The thus-obtained alkali aluminate solution containing small amounts of a silica component and large amounts of an alumina component is cooled, and fed to a precipitation-classification apparatus 108 of aluminum hydroxide through a line 22, to thereby precipitate and classify aluminum hydroxide. After completion of precipitation, the solution is fed to a solid-liquid separation apparatus 109 through a line 25, and aluminum hydroxide particles are separated from the solution. After being washed, the aluminum hydroxide particles are fed to a calcination apparatus 110 through a line 27, to thereby produce alumina 111 which is a final product. The alkali aluminate solution which is separated in the precipitation-classification apparatus 108 and the alkali aluminate solution which is separated in the solid-liquid separation apparatus 107 and 109 are introduced, through lines 24 and 26, respectively, into the heat recovery apparatus 104 and the grinding apparatus 113, and recycled.

The desilication product which is separated in the solid-liquid separation apparatus 107 is dehydrated and washed, and then supplied to a mixing-granulation apparatus 115 through a line 7. In the apparatus, the product is mixed with a calcium compound 114 and the mixture is shaped. The mixing-granulation apparatus 115 may be a multi-shaft kneader, a pan-type pelletizer, or an extrusion shaping apparatus. Examples of calcium compounds 114 which may be employed include limestone, quicklime, slaked lime, and calcium carbonate, which compounds are available in mass amounts at low cost. The amount of a calcium compound which is added to the desilication product is regulated by the mol ratio of CaO in the calcium compound to $SiO_2$ in the desilication product. The ratio; i.e., $CaO/SiO_2$, is about 2–5. The amount is determined on the basis of dried products. The mixture is supplied to a calcination apparatus 116 through a line 8. The particle size of the mixture is preferably about 1–50 mm, in order to avoid breakage of the mixture as much as possible in a conveying apparatus and the calcination apparatus 116, and to enable sufficient calcination of the mixture in the calcination apparatus 116.

The calcination apparatus 116 may be a continuous rotary kiln, a tunnel-type calcination furnace, or a batch-type furnace. In order to effectively carry out sodium removal reaction, the calcination temperature is preferably about 1,150–1,350° C. The calcination time is about 30 minutes to about two hours, preferably about 40–80 minutes.

After completion of calcination, the calcined product is cooled by use of air serving as a calcination fuel or by means of a cooling apparatus 117. The product is fed to a grinding apparatus 118 through a line 11 and ground. The calcined product is relatively soft, and thus the product can be ground sufficiently by use of a hammer mill or a pin mill serving as a grinding apparatus 118. Cleaning water is added to the ground product, and the resultant slurry is supplied to a solid-liquid separation apparatus 120 through a line 13. The solid-liquid separation apparatus 120 may be a vacuum-type or pressure-type filtering apparatus. The filtrate; i.e., an alkali aluminate solution, is conveyed through a line 23, and combined with the alkali aluminate solution through a line 26, which is obtained from the solid-liquid separation apparatus 109 after precipitation of aluminum hydroxide. The thus-combined solution is recovered as an alkali solution which is used in Bayer's process, and recycled. The separated solid product is washed with water and dried, and then recovered as calcium aluminosilicate 121 containing alkali in small amounts. The solid product is used as a raw material of cement.

The "silica elution promoting process" will next be described with reference to FIGS. 4A and 4B. As shown in FIGS. 4A and 4B, a recycled alkali aluminate solution supplied through a line 14 is mixed with bauxite 201 supplied through a line 1, and the slurry mixture is supplied to a grinding apparatus 202. A ball mill or rod mill is used as the grinding apparatus 202. The bauxite is finely ground and the resultant slurry is supplied to a silica elution apparatus 203 through a line 2. In the elution apparatus 203, a reactive silica component in the bauxite is eluted. After a reactive silica component is extracted from the slurry under the above-described conditions, the slurry is supplied to a solid-liquid separation apparatus 204 through a line 3. The slurry conveyed through the line 3 has a high temperature, and thus the heat of the slurry is exchanged with that of a recycled alkali aluminate conveyed through a line 16. In order to carry out the heat exchange, there is provided a heat recovery apparatus 204 which comprises a plurality of multi-step flashing cans for cooling the slurry in the line 3, and a heat exchanger provided at the line 16.

In order to prevent production of a desilication product, the slurry is immediately supplied from a reaction apparatus to a solid-liquid separation apparatus 205 through the evaporation-heat recovery apparatus 204 and a line 4. The solid-liquid separation apparatus 205 may be an apparatus similar to that used in the "silica elution suppressing apparatus." When the slurry is separated into a filtrate and an insoluble residue in the solid-liquid separation apparatus 205 within about 30 minutes after the slurry is obtained from the reaction apparatus, production of a desilication product can be prevented.

The insoluble residue which is separated from the slurry in the solid-liquid separation apparatus 205 is bauxite containing a reactive silica component in very small amounts. The residue is fed to an alumina extraction apparatus and an evaporation-heat recovery apparatus 207 through a line 21, for treatment in the conventional Bayer's process. After completion of dissolution, a solution containing the residue is supplied to a solid-liquid separation apparatus 208 through a line 25. Thereafter, an insoluble residue predominantly comprising iron oxide containing a desilication product in very small amounts is recovered through a line 30. The filtrate which is separated in the solid-liquid separation apparatus 208 is fed to a customary precipitation-classification apparatus 209 through a line 26. Subsequently, alumina is produced in the same manner as in the "silica elution suppressing process."

The solution separated from the slurry in the solid-liquid separation apparatus 205 contains $SiO_2$ in an amount of about 4–12 g/l, and thus the solution is supplied to a desilication apparatus 214 through a line 5, for precipitation of a desilication product. The desilication apparatus 214 is a reaction vessel provided with a stirring apparatus. In order to promote desilication reaction, a desilication product serving as seeds is added to the apparatus 214 through a line 19. In the desilication reaction vessel, the reaction conditions are as follows. The reaction temperature is about 120–160° C., the reaction time is about 30 minutes to about four hours, the mean particle size of the desilication product serving as seeds is about 1–25 $\mu$, and the amount of the desilication product which is added is about 20–200 g/l. When desilication is carried out under these conditions, the amount of $SiO_2$ in a solution extracted from the above solution is reduced to about 1–2 g/l. After completion of desilication, the solution containing a precipitate is fed to a solid-liquid Separation apparatus 215 through a line 6, for separation of a desilication product. The separation apparatus 215 may be a centrifugal apparatus, a filtering apparatus, or a thickener, which is the same apparatus used in the "silica elution suppressing process."

The desilication product which is separated in the solid-liquid separation apparatus 215 is recovered through a line 15 to the grinding apparatus 216 in which bauxite is ground, and the product is used as particles. The solution which is separated in the separation apparatus 215 is fed to the evaporation-heat recovery apparatus 204 through the line 16. If necessary, an alkali solution is supplemented to the separated solution or the separated solution is concentrated, to thereby regulate the concentration of alkali in the solution.

Thus, the separated solution is recycled.

The desilication product which is separated in the solid-liquid separation apparatus 215 is dehydrated and washed, and then supplied to a mixing-granulation apparatus 217 through a line 7. In the apparatus 217, the product is mixed with a calcium compound 218 and the mixture is shaped. The procedure after the shaped product is conveyed through a line 8 is the same as in the case of the "silica elution suppressing process."

The present invention provides a process for treating bauxite, in which an alkali component of an insoluble residue—which is produced when alumina is extracted from bauxite with an alkali aluminate solution—is substantially removed, the residue is effectively used as a raw material of cement or iron, the alkali component of the residue can be recovered in Bayer's process, and no additional waste is produced during dealkalization. The process is environmentally friendly and is industrially carried out with ease. Specifically, the process provides the following advantages.

(1) Waste containing a disadvantageous alkali component can be eliminated.
(2) The amount of alkali (sodium hydroxide) which is used in the process is reduced to about 20% as compared with the case of a conventional process. As a result, indirectly, the amount of chlorine which is generated during production of sodium hydroxide can be reduced.
(3) The amount of an alkali component of red mud can be reduced to about 1% or less, and thus the red mud is effectively used in the iron production industry or other industries.
(4) The amount of red mud which is produced can be reduced to about 70% as compared with the case of a conventional process.
(5) The amount of an alkali component of calcium silicate which is a by-product is reduced to about 1% or less, and thus the calcium silicate is effectively used for producing cement, glass, etc.
(6) The yield of alumina is enhanced.
(7) The quality of alumina is enhanced.
(8) Although a calcination step is provided in the present process, the amount of energy which is consumed is almost equivalent to that in a conventional process.
(9) An organic impurity can be removed, and thus efficiency in a dissolution step can be maintained.

EXAMPLES

The present invention will next be described by way of examples, which should not be construed as limiting the invention thereto, Solid products shown in examples and comparative example were analyzed on the basis of JIS M8361. Meanwhile, solutions were analyzed by means of a neutralization titration method.

Bauxite mined in Indonesia was employed as a raw material. The chemical analytic values thereof are shown in Table 1.

Example 1

Bauxite was mixed with an alkali aluminate solution of 100° C. ($Na_2O$ concentration: 124 g/l, $Al_2O_3/Na_2O$ (weight ratio): 0.58), so as to attain a bauxite concentration of 800 g/l. The mixture was ground by use of a rod mill immediately after mixing. An alkali aluminate solution having the same composition as the above-solution was added to the ground slurry (bauxite concentration: approximately 140 g/l on the basis of the entirety of the resultant solution). The resultant solution was continuously supplied to an isothermal vessel provided with an inner stirring apparatus (volume: 4 $m^3$), so as to maintain a retention time of 15 minutes.

The isothermal vessel was maintained at 125° C., and the slurry was cooled to 104° C. in a cooling apparatus provided at the outlet of the vessel. Thereafter, the slurry was separated into solid and liquid by use of a filter press. In the separated solution, the concentration of $SiO_2$ was 3.0 g/l, and $Al_2O_3/Na_2O$ (by weight) was 1.11. The separated solid was washed with water and dried, yielding an insoluble residue (A). The composition of the residue (A) is shown in Table 1.

The thus-separated solution was continuously supplied to a stirring apparatus provided isothermal vessel which can maintain temperature at 100° C. A desilication product serving as seeds was added to the solution so as to attain a concentration of 30 g/l on the basis of the entirety of the solution, and the mixture was maintained in the isothermal vessel for one hour, precipitating a silica component of the solution. Subsequently, the slurry which was obtained from the isothermal vessel was separated into solid and liquid. The concentration of $SiO_2$ in the separated solution was 0.5 g/l. The composition of the separated insoluble residue (B) is shown in Table 2.

The insoluble residue was mixed with ground quicklime (product of Ryoko Sekkai Kogyo). The mol ratio of CaO in the quicklime to $SiO_2$ in the residue; i.e., $CaO/SiO_2$, was 3.0. The mixture was shaped by use of a pan-type pelletizer, forming a shaped product having a size of 5 mm or less. The shaped product was supplied to a stationary calcination furnace and calcined at 1,200° C. for 60 minutes, to thereby obtain a calcined product. The calcined product was cooled, and then ground by use of a hammer mill so as to attain a size of 60 mesh or less. Hot water of 90° C. was added to the ground product, forming a slurry, and the slurry was filtered by use of a filter press, and the resultant solid product (C) was washed with water. The composition of the solid product (C) is shown in Table 3.

Example 2

Bauxite having the same composition as in Example 1 was mixed with an alkali aluminate solution of 100° C. ($Na_2O$ concentration: 208 g/l, $Al_2O_3/Na_2O$ (weight ratio): 1.12), so as to attain a bauxite concentration of 800 g/l. The mixture was ground by use of a rod mill immediately after mixing. An alkali aluminate solution having the same composition as the above solution was added to the ground slurry (bauxite concentration: approximately 300 g/l on the basis of the entirety of the resultant solution). The resultant solution was continuously supplied to an isothermal vessel provided with an inner stirring apparatus (volume: 4 $m^3$), so as to maintain a retention time of 90 minutes. The isothermal vessel was maintained at 105° C., and the slurry which was exhausted from the vessel was separated into solid and liquid by use of a filter press.

The separated solid was mixed with an alkali aluminate solution of 100° C. ($Na_2O$ concentration: 126 g/l, $Al_2O_3/Na_2O$ (weight ratio): 0.58), so as to attain a solid concentration of 800 g/l. An alkali aluminate solution having the same composition as in Example 1 was added to the resultant slurry such that a solution after dissolution had an $Al_2O_3/Na_2O$ ratio (by weight) of 1.10. The resultant slurry was continuously supplied to an isothermal vessel provided with an inner stirring apparatus (volume: 4 $m^3$), so as to maintain a retention time of 20 minutes. The isothermal vessel was maintained at 140° C., and the slurry was cooled to 104° C. in a cooling apparatus provided at the outlet of the vessel. Thereafter, the slurry was separated into solid and liquid. The composition of the separated insoluble residue (D) is shown in Table 1. In the separated solution, the concentration of silica was 0.6 g/l.

In the separated solution, the concentration of $SiO_2$ was 11 g/l and the $Al_2O_3/Na_2O$ ratio (by weight) was 1.13. The separated solution was continuously supplied to a stirring apparatus-provided isothermal vessel which car maintain temperature at 140° C. A desilication product serving as seeds was added to the solution so as to attain a concentration of 100 g/l on the basis of the entirety of the solution, and the mixture was maintained in the isothermal vessel for 90 minutes, precipitating silica in the solution. Subsequently, the slurry which was obtained from the isothermal vessel was separated into solid and liquid. The composition of the separated insoluble residue (E) is shown in Table 2.

The insoluble residue was mixed with ground quicklime (product of Ryoko Sekkai Kogyo). The mol ratio of CaO in the quicklime to $SiO_2$ in the residue; i.e., $CaO/SiO_2$, was 3.0. The mixture was shaped by use of a pan-type pelletizer, forming a shaped product having a size of 5 mm or less. The shaped product was supplied to a stationary calcination furnace and calcined at 1,400° C. for 40 minutes, to thereby obtain a calcined product. The calcined product was cooled, and then ground by use of a hammer mill so as to attain a size of 60 mesh or less. Hot water of 90° C. was added to the ground product, forming a slurry, and the slurry was filtered by use of a filter press, and the resultant solid product (J) was washed with water. The composition of the solid product (J) is Shown in Table 3.

TABLE 1

| Sample code | | Bauxite | (A) | (D) |
|---|---|---|---|---|
| $Al_2O_3$ | wt % | 52.1 | 13.4 | 12.2 |
| $Fe_2O_3$ | wt % | 14.7 | 59.8 | 62.4 |
| $TiO_2$ | wt % | 1.3 | 6.8 | 5.5 |
| $SiO_2$ | wt % | 3.6 | 7.6 | 8.4 |
| $Na_2O$ | wt % | 0.1 or less | 0.9 | 0.9 |
| LOI | wt % | 28.3 | 11.3 | 10.4 |

LOI: loss of ignition

TABLE 2

| Sample code | | (B) | (E) |
|---|---|---|---|
| $Al_2O_3$ | wt % | 34.9 | 34.2 |
| $SiO_2$ | wt % | 33.8 | 33.6 |
| $Na_2O$ | wt % | 23.0 | 23.3 |
| LOI | wt % | 8.3 | 8.7 |

EXAMPLE 3

The procedure of Example 1 was repeated by use of the insoluble residue (B) obtained in Example 1, except that the calcination temperature and the amount of quicklime which was added were changed, to thereby obtain solid products (H and F). The compositions of the products are shown in Table 3.

COMPARATIVE EXAMPLE 1

The procedure of Example 1 was repeated by use of the insoluble residue (B) obtained in Example 1, except that the calcination temperature was changed to 1,100° C., to thereby obtain a sample (I). In addition, the procedure of Example 1 was repeated by use of the insoluble residue (B) obtained in Example 1, except that slaked lime was employed instead of quicklime, to thereby obtain a sample (C). The compositions of these samples are shown in Table 3.

TABLE 3

| Sample code | | (I) | (H) | (C) | (F) | (J) | (G) |
|---|---|---|---|---|---|---|---|
| Calcium raw material | | Quicklime | Quicklime | Quicklime | Quicklime | Quicklime | Slaked lime |
| Calcination temperature | ° C. | 1,100 | 1,200 | 1,200 | 1,200 | 1,400 | 1,200 |
| $CaO/SiO_2$ | Mol ratio | 3.0 | 2.0 | 3.0 | 4.0 | 3.0 | 3.0 |
| $Al_2O_3$ | wt % | 17.1 | 17.8 | 16.2 | 15.8 | 13.6 | 16.6 |
| CaO | wt % | 47.8 | 46.7 | 48.6 | 50.2 | 51.4 | 48.6 |

TABLE 3-continued

| Sample code | | (I) | (H) | (C) | (F) | (J) | (G) |
|---|---|---|---|---|---|---|---|
| $SiO_2$ | wt % | 18.1 | 24.8 | 18.3 | 16.0 | 20.0 | 18.1 |
| $Na_2O$ | wt % | 1.2 | 1.0 | 0.9 | 0.6 | 1.1 | 0.8 |
| LOI | wt % | 15.8 | 9.8 | 16.1 | 17.4 | 14.0 | 15.9 |

What is claimed is:

1. A process for treating bauxite comprising
 a) a step of mixing bauxite and an aqueous alkali solution to form a first mixture comprising a first insoluble residue and a first aqueous solution and separating the first mixture into the first insoluble residue and the first aqueous solution, wherein said mixing of bauxite and said aqueous alkali solution is conducted at a temperature of 105° C. to 140° C. for a time of 1 minute to 40 minutes and said alkali aqueous solution has a concentration of $Na_2O$ in a range of 100 g/l to 150 g/l;
 b) a step of adding seeds into said first aqueous solution to precipitate sodium aluminosilicate and separating said precipitated sodium aluminosilicate from a remaining solution of said first aqueous solution; and
 c) a step of adding and mixing said separated sodium aluminosilicate with a calcium compound to form a second mixture, calcining the second mixture to form a calcined product, washing the calcined product with water, followed by filtering to obtain a second insoluble residue and a second aqueous solution.

2. A process for treating bauxite according to claim 1, wherein precipitation of a desilication product in the first insoluble residue is prevented by carrying out solid-liquid separation immediately after the alumina component is extracted from the bauxite with the aqueous alkali solution.

3. A process for treating bauxite according to claim 1, wherein the first insoluble residue contains $Na_2O$ in an amount of 1 wt % or less.

4. A process for treating bauxite according to claim 1, wherein the first insoluble residue is used as a raw material for iron production.

5. A process for treating bauxite comprising:
 a) a step of mixing bauxite and an aqueous alkali solution to form a third mixture comprising a third insoluble residue and a third aqueous solution, wherein said mixing of bauxite and said aqueous solution is conducted at a temperature of 100° C. to 120° C. for a time of 40 minutes to 7 hours and said aqueous alkali solution has a concentration of $Na_2O$ in a range of 155 g/l to 240 g/l, separating the third mixture into the third insoluble residue and the third aqueous solution, mixing said third insoluble residue and another aqueous alkali solution to form a first mixture comprising a first insoluble residue and a first aqueous solution and separating the first mixture into the first insoluble residue and the first aqueous solution;
 b) a step of adding seeds into said third aqueous solution to precipitate sodium aluminosilicate and separating said precipitated sodium aluminosilicate from a remaining solution of said third aqueous solution; and
 c) a step of adding and mixing said separated sodium aluminosilicate with a calcium compound to form a second mixture, calcining the second mixture to form a calcined product, washing the calcined product with water, followed by filtering to obtain a second insoluble residue and a second aqueous solution.

6. A process for treating bauxite according to claim 1 or 5, wherein said second aqueous solution contains $Na_2O$ together with an alumina component.

7. A process for treating bauxite according to claim 1 or 5, wherein said aqueous alkali solution is an aqueous sodium hydroxide solution.

8. A process for treating bauxite according to claim 1 or 5, wherein the calcium compound includes at least one species selected from among limestone, quicklime, slaked lime, and calcium carbonate.

9. A process for treating bauxite according to claim 1 or 5, wherein the calcium compound is added to the sodium aluminosilicate in a molar ratio $CaO/SiO_2$ of 2.0 to 5.0 in which the calcium compound is reduced to CaO and the $SiO_2$ is that in the sodium aluminosilicate, and said calcination is carried out at 1150 to 1350° C.

10. A process for treating bauxite according to claim 1 or 5, wherein the sodium aluminosilicate and the calcium compound, which are to be calcined, have a particle size of 60 μm or less.

11. A process for treating bauxite according to claim 1 or 5, wherein the sodium aluminosilicate and the calcium compound are granulated before the calcination, for suppressing dust generation during the calcination.

12. A process for treating bauxite according to claim 1 or 5, wherein heat generated during the calcination is used in a process for producing aluminum hydroxide or alumina from bauxite.

13. A process for treating bauxite according to claim 1 or 5, wherein an organic impurity which is generated and accumulated in a process for producing aluminum hydroxide or alumina from bauxite is incinerated during the calcination.

14. process for treating bauxite according to claim 1 or 5, wherein the second insoluble residue contains $Na_2O$ in an amount of 1 wt % or less.

15. A process for treating bauxite according to claim 1 or 5, wherein the second insoluble residue is used as a raw material for cement.

16. A process for treating bauxite according to claim 1 or 5, wherein the sodium aluminosilicate is sodalite or a substance predominantly containing sodalite.

17. A process for treating bauxite according to claim 1 or 5, wherein $Na_2O$ which is recovered in step c) is recycled in the process for treating bauxite.

18. A process for treating bauxite according to claim 5, wherein the third insoluble residue contains $Na_2O$ in an amount of 1 wt % or less.

19. A process for treating bauxite according to claim 5, wherein the first or third insoluble residue is used as a raw material for iron production.

* * * * *